United States Patent
Shklar et al.

(10) Patent No.: US 12,050,187 B1
(45) Date of Patent: Jul. 30, 2024

(54) DUAL SOURCE X-RAY INSPECTION SYSTEM AND METHOD

(71) Applicant: Xwinsys Technology Developments Ltd., Migdal HaEmek (IL)

(72) Inventors: Avishai Shklar, Kfar Vitkin (IL); Yeroslav Berezin, Or Akiva (IL); Ofek Oiknine, Ramat Yishai (IL)

(73) Assignee: XWINSYS Technology Developments Ltd., Migdal HaEmek (IL)

( * ) Notice: Subject to any disclaimer, the term of this patent is extended or adjusted under 35 U.S.C. 154(b) by 0 days.

(21) Appl. No.: 18/369,411

(22) Filed: Sep. 18, 2023

(51) Int. Cl.
  *G01N 23/20* (2018.01)
  *G01N 23/04* (2018.01)
  *G01N 23/20025* (2018.01)

(52) U.S. Cl.
  CPC ..... *G01N 23/043* (2013.01); *G01N 23/20025* (2013.01)

(58) Field of Classification Search
  None
  See application file for complete search history.

(56) References Cited

U.S. PATENT DOCUMENTS

| | | | |
|---|---|---|---|
| 6,754,304 B1 * | 6/2004 | Kumakhov | G01N 23/223 378/45 |
| 8,249,220 B2 | 8/2012 | Verman et al. | |
| 10,697,908 B2 | 6/2020 | Reinis et al. | |
| 2004/0213373 A1 | 10/2004 | Wilson et al. | |
| 2008/0159474 A1 | 7/2008 | Hubbard-Nelson et al. | |
| 2013/0034204 A1 | 2/2013 | Matoba et al. | |
| 2015/0369759 A1 * | 12/2015 | Mazor | G01N 23/207 378/89 |
| 2021/0116399 A1 | 4/2021 | Ogata et al. | |
| 2023/0236143 A1 * | 7/2023 | Zhang | G01N 23/223 378/45 |

* cited by examiner

*Primary Examiner* — Hoon K Song
(74) *Attorney, Agent, or Firm* — Whitestone Law, PLLC

(57) ABSTRACT

An X-ray inspection system and method are presented. The system comprising: at least two X-ray sources positioned and oriented at selected angles with respect to an inspection plane, to provide a common illumination spot on said inspection plane, thereby enabling inspection of common regions of a sample with at least one of increased irradiation intensity or two or more different irradiation characteristics while reducing navigation and registration processing.

18 Claims, 7 Drawing Sheets

DUAL SOURCE X-RAY INSPECTION SYSTEM AND METHOD

TECHNOLOGICAL FIELD

The present disclosure is in the field of X-ray inspection of a sample, and specifically relates to inspection using two or more X-ray radiation sources.

BACKGROUND

Inspection of fabricated samples is an important part of manufacturing processes. Various manufactured articles may be inspected for structural parameters, selected patterns, and material composition. With technological advances, the manufactured articles become smaller and required inspection accuracy is increased.

X-ray fluorescence (XRF) inspection provides is a nondestructive technique enabling detection of elemental composition of materials. XRF inspection utilizes fluorescence caused by excitation of sample material by X-ray radiation provided by an x-ray source. Atoms of different elements produce characteristic fluorescence emission unique to each element, allowing detection of material composition of a sample. Energy dispersive X-ray Fluorescence (EDXRF) is one of several XRF techniques commonly used in elemental analysis applications, enabling detection of various elements existing in a sample material.

U.S. Pat. No. 10,697,908 provides a method and an apparatus for apparatus for inspecting a semiconductor wafer for abnormalities by accurately measuring elemental concentration at a target area. The apparatus includes an x-ray imaging subsystem for measuring an elemental composition at the target area of the semiconductor wafer. The apparatus further includes an EDXRF subsystem for measuring an elemental concentration at the target area of the semiconductor wafer. The elemental concentration may be calibrated by first correlating the elemental concentration measurements obtained using x-ray imaging system for the target area with the elemental concentration measurements obtained using the EDXRF subsystem for the target area to receive an augmented and accurate elemental concentration measurement for the target area of the semiconductor wafer.

U.S. Pat. No. 8,249,220 provides an x-ray optical system includes an x-ray source which emits x-rays, a first optical element which conditions the x-rays to form two beams and at least a second optical element which further conditions at least one of the two beams from the first optical element.

GENERAL DESCRIPTION

Bandwidth and energy range of X-ray radiation used for XRF may affect noise associated with radiation portions being reflected and/or scattered masking over fluorescent response. To this end, a complete inspection of a manufactured sample may often require inspection using two or more different inspection conditions. This may require inspection of a sample using two inspection systems, or replacement of an inspection unit within an existing inspection system. The present disclosure provides an inspection system configuration utilizes two or more inspection units, both positioned over a sample region of an inspection system and configured to illuminate a common spot on the sample. This configuration enables several operation modes comprising simultaneously illumination of selected locations on the sample with X-ray radiation from the two or more x-ray sources and thus increasing illumination intensity, and/or sequential illumination of selected locations on the sample using first and second x-ray sources having different illumination characteristics. Further, alignment of the two or more inspection units to a common illumination spot may provide for simplifying navigating and registration of output data to sample arrangement.

The system configuration of the present disclosure has several advantaged over the conventional techniques, in accordance with relation between energy bands of X-ray sources used in the system. For example, when utilizing two or more X-ray sources having similar energy band output, the illumination flux, and thus intensity per unit area can be increased. alternatively, the use of X-ray sources configured to emit X-ray radiation of two or more different illumination properties such as illumination energy (wavelength) based on the use of two or more different X-ray sources provides various additional advantages and enables unique applications.

Patent applications IL301287 and U.S. Ser. No. 18/142,161, assigned to the assignee of the present application describes a sample inspection system comprising at least first and second inspection units positioned above a sample region. Each of said at least first and second inspection unit comprises at least one X-ray radiation source and respective detector arrangement and configured for X-ray fluorescent inspection of a sample. The first and second x-ray inspection units provide first and second inspection properties different in at least one of: bandwidth of emitted X-ray energies, energy of emitted X-rays, spot size of X-ray beam generated on a sample.

The use of two or more X-ray sources within a sample inspection system may enhance inspection accuracy and increase signal to noise ratio for detection of selected elements. However, further scanning and registration of feature location on the sample may prolong inspection time.

The present disclosure provides an X-ray inspection system comprising two or more X-ray sources positioned and oriented for illuminating a common region on the sample. The two or more X-ray sources may be operated simultaneously to provide enhanced illumination intensity, allowing detection or relatively low-signal data. Additionally, or alternatively, the two or more X-ray sources may be operated sequentially to provide scanning with two or more illumination properties while eliminating the need for repeating registration and thus reducing inspection time.

Further, the two or more X-ray inspection units may operate using common detection arrangement. More specifically, as X-ray radiation originating from at least first and second X-ray sources is directed at a common selected illumination spot on the sample, common detection arrangement can be used for collecting fluorescent emission from the sample. This configuration allows for simplifying system construction and costs.

Thus, according to one broad aspect, the present disclosure provides an X-ray inspection system comprising:

at least two X-ray sources positioned and oriented at selected angles with respect to an inspection plane, to provide a common illumination spot on said inspection plane.

According to some embodiments, the inspection system may further comprise a sample mount for placing a sample to be inspected, said sample mount defining said inspection plane, and wherein said at least two X-ray sources are placed at selected angles with respect to said inspection plane.

According to some embodiments, the at least two X-ray sources may be positioned or placed at equal distances with respect to said common illumination spot.

According to some embodiments, the at least two X-ray sources may be positioned or placed symmetrically with respect to normal to said inspection plane intersecting said inspection plane at said common illumination spot.

According to some embodiments, the at least two X-ray sources may be positioned or placed in at least first and second different distanced with respect to said common illumination spot.

According to some embodiments, the at least two X-ray sources may be configured for emitting X-ray radiation formed of one or more discrete energy bands.

According to some embodiments, the at least two X-ray sources may be polychromatic X-ray sources.

According to some embodiments, the at least two X-ray sources may be configured to emit radiation of similar energy properties.

According to some embodiments, the inspection system may further comprise an optical microscope positioned between said at least two X-ray sources, said optical microscope being aligned with respect to normal to said inspection plane and directed for imaging said common illumination spot on said inspection plane.

According to some embodiments, the optical microscope may be oriented for imaging said illumination spot at normal angle with respect to said inspection plane.

According to some embodiments, the inspection system may comprise two X-ray sources, said two X-ray sources are positioned and oriented symmetrically at two opposing sides of a virtual plane perpendicular to said inspection plane.

According to some embodiments, the inspection system may comprise three X-ray sources positioned and oriented in a triangular symmetry with respect to an axis perpendicular to said inspection plane and intersecting said inspection plane at said common illumination spot.

According to some embodiments, the at least two X-ray sources may be positioned with respective two or more different angular orientations and distances while directed to illuminate said common illumination spot on said inspection plane.

According to some embodiments, the inspection system may further comprise a detector arrangement comprising at least one X-ray detector configured for collecting fluorescent response from said sample in response to illumination using at least one of said at least two X-ray sources.

According to some embodiments, the detector arrangement may comprise at least two detectors, each detector is configured to collect X-ray fluorescent emission from the sample in response to irradiation by either one of said at least at least two X-ray sources. According to some embodiments, the detector arrangement may comprise at least one silicon drift detector.

According to one other broad aspect, the present disclosure provides a method for use in sample inspection, the method comprising:
(a) providing an inspection system having two or more X-ray sources oriented to illuminate a common illumination spot;
(b) placing a sample at an inspection plane for inspection;
(c) shifting said common illumination spot with respect to said sample for scanning said sample using at least one of said two or more X-ray sources, and
(d) providing output data indicative of collected signal from one or more regions of the sample.

According to some embodiments, the method may further comprise: for one or more selected regions of the sample, operating said two or more X-ray sources sequentially illuminating said sample using said two or more X-ray sources, one at a time, and collecting signal with respect to the selected location and the selected X-ray source, thereby scanning said sample using said two or more X-ray sources.

According to some embodiments, the method may comprise scanning said sample using a first X-ray source of said two or more X-ray sources and operating one or more additional X-ray sources of said two or more X-ray sources for scanning selected regions of the sample in accordance with one or more region parameters.

According to some embodiments, the method may further comprise operating at least two or said two or more X-ray sources for illuminating one or more selected regions of the sample, thereby enhancing illumination intensity and signal collection.

According to yet another broad aspect, the present disclosure provides a program storage device readable by machine, embedded in a non-transitory computer readable medium, tangibly embodying a program of instructions executable by the machine to perform a method for use in sample inspection, the method comprising:
(e) in response to input signal indicating a sample placed at an inspection plane;
(f) operating a sample mount for shifting said sample within a scanning pattern to inspect one or more region of the sample;
(g) for each scanning position operating two or more X-ray sources for sequentially illuminating said sample using said two or more X-ray sources, one at a time, and collecting signal with respect to the selected location and the selected X-ray source; and
(h) generating output data indicative of scanning said sample using said two or more X-ray sources.

According to further broad aspect, the present disclosure provides computer program product comprising a computer useable medium having computer readable program code embodied therein for use in sample inspection, the computer program product comprising:
computer readable program code for causing the computer to be responding to indication on a sample placed at an inspection plane;
computer readable program code for causing the computer to operate a sample mount for shifting said sample within a scanning pattern to inspect one or more region of the sample;
computer readable program code for causing the computer to selectively operate one or more of a selected two or more X-ray sources to illuminate a common illumination spot on said sample and collect signal with respect to the selected location and the selected X-ray source;
computer readable program code for causing the computer to generate output data indicative of scanning said sample using said two or more X-ray sources.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A illustrates generally similar X-ray sources, FIG. 1B illustrates the use of different X-ray sources;

DETAILED DESCRIPTION OF EMBODIMENTS

As indicated above, the present disclosure provides an X-ray inspection system comprising at least two X-ray sources. The at least two X-ray sources are positioned and oriented at selected angles with respect to an inspection plane to illuminate a common illumination spot on the inspection plane where a sample is generally placed.

Figure 1A:
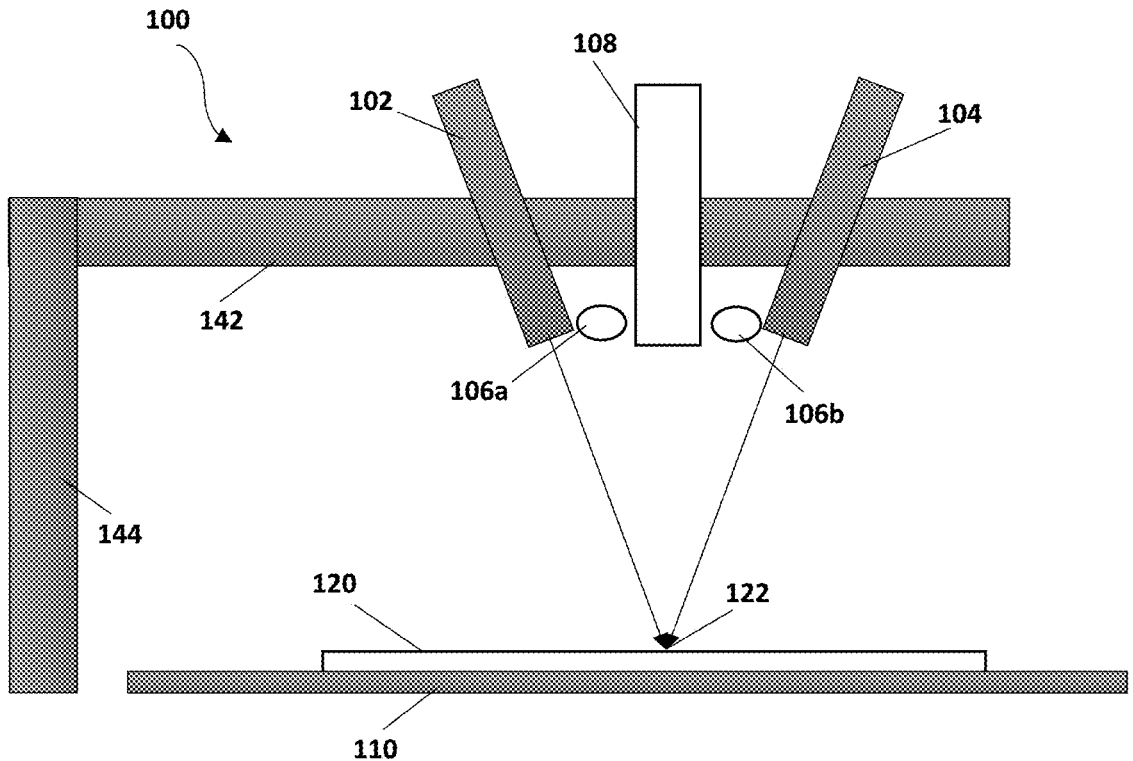
FIGS. 1A and 1B illustrate schematically an inspection system utilizing two or more X-ray sources according to some embodiments of the present disclosure.
Figure 1B:
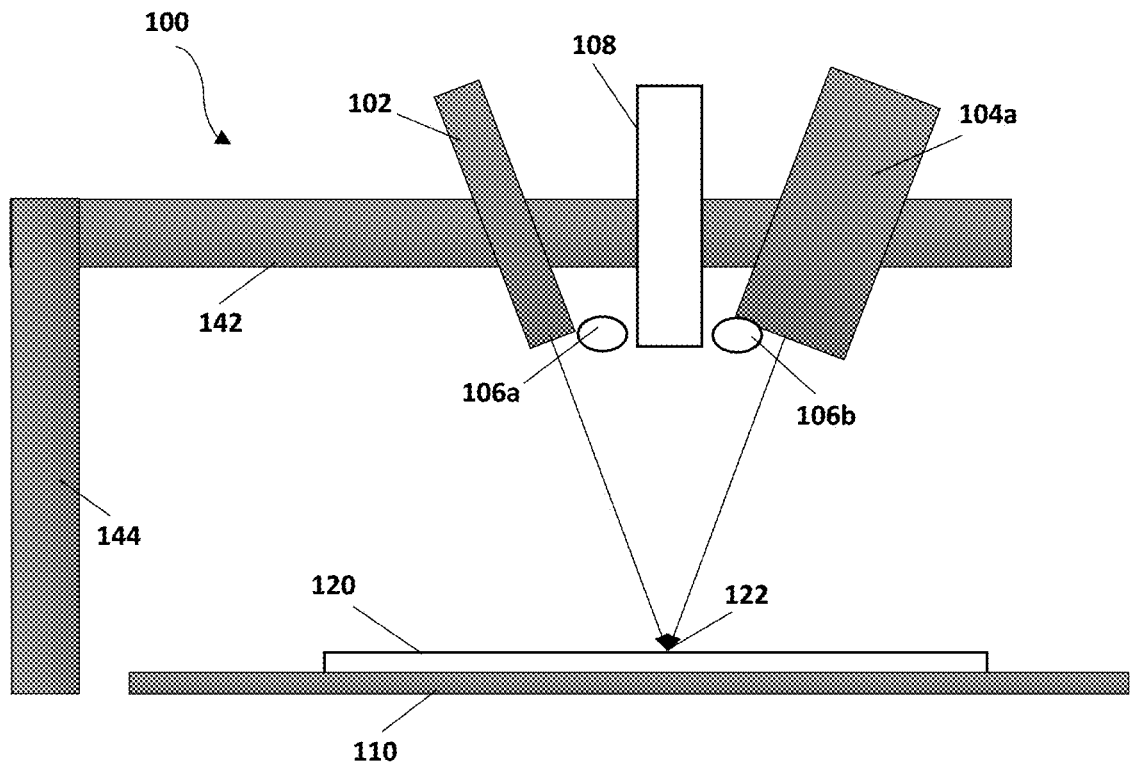

Reference is made to FIGS. 1A and 1B illustrating two exemplary configurations of an inspection system 100 according to some embodiments of the present disclosure. FIG. 1A illustrates an inspection system 100 including two generally similar X-ray sources 102 and 104 and FIG. 1B illustrates an inspection system 100 including two X-ray sources different in at least one X-ray emission characteristic. It should be noted that X-ray sources 102 and 104 are illustrated in FIG. 1B as having different size to emphasize that this X-ray sources provide illumination having different characteristics. Generally, however, the actual size and form factor of X0ray sources 102 and 104 may be similar or different.

FIG. 1A illustrated schematically an X-ray inspection system 100 including a first X-ray source 102, a second X-ray source 104, and a sample mount 110. Generally, the first and second X-ray sources may be mounted on a common beam 142 placed on a frame 144. Further, the inspection system 100 may include a detector arrangement 106 including one or more detectors (e.g., detectors 106a and 106b), and an optional optical microscope 108. FIG. 1B illustrates an inspection system 100 utilizing first 102 and second 104a X-ray sources, wherein the X-ray sources are selected to provide X-ray radiation different in at least one of radiation energy range, or specific radiation energies, to enables inspection with first and second different characteristics.

The first 102 and second 104, 104a, X-ray sources may each include a radiation source and respective optics for directing emitted radiation of the first and second beams. Further, the first and second X-ray sources may be configured to provide similar beam parameters, such as radiation energy (wavelength) to enhance irradiation intensity. Alternatively, exemplified in FIG. 1B, utilize different X-ray sources to provide radiation that is different in energy range and/or peak energy, to enable inspection using different X-ray illumination properties.

Generally, the X-ray sources (102, 104, 104a) may be mounted on a common connector placed on a beam 142 and connected to system structure 144. Further, the X-ray sources (102, 104, 104a) are oriented to direct emitted radiation toward a common illumination spot 122. In this connection, the inspection system 100 is adapted for inspection of a sample 120 placed on the sample mount 110. The location of the sample mount defines an inspection plane, associated with location of the sample 120. This is while the X-ray source (102, 104, 104a) are oriented to emit radiation toward a common illumination spot 122, providing inspection of regions of the sample 120 located at the illumination spot 122 by proper location of the sample mount 110.

Typically, in various inspection systems, each radiation source is associated with one or more detectors. The inspection system 100 of the present disclosure utilizes one or more detectors, exemplified by detectors 106a and 106b, commonly used for detection of sample response to illumination using the first and/or second X-ray sources. In this connection, the use of two or more X-ray sources directed at a common illumination spot, enables cost, space and complexity saving by allowing the sue of common detector arrangement shared by the X-ray sources.

In some examples, the first 102 and second 104 X-ray sources may be polychromatic X-ray sources. In some other examples, The inspection system 100 may also include an optical microscope 108. The optical microscope 108 may be mounted on a common connector attached to beam 142 and is positioned to provide optical imaging of the common illumination spot 122. The optical microscope 108 may be used for inspection of the sample 120, to select proper regions where inspection using the first 102 and/or second (104, 104a) or both X-ray sources is needed.

Figure 2:
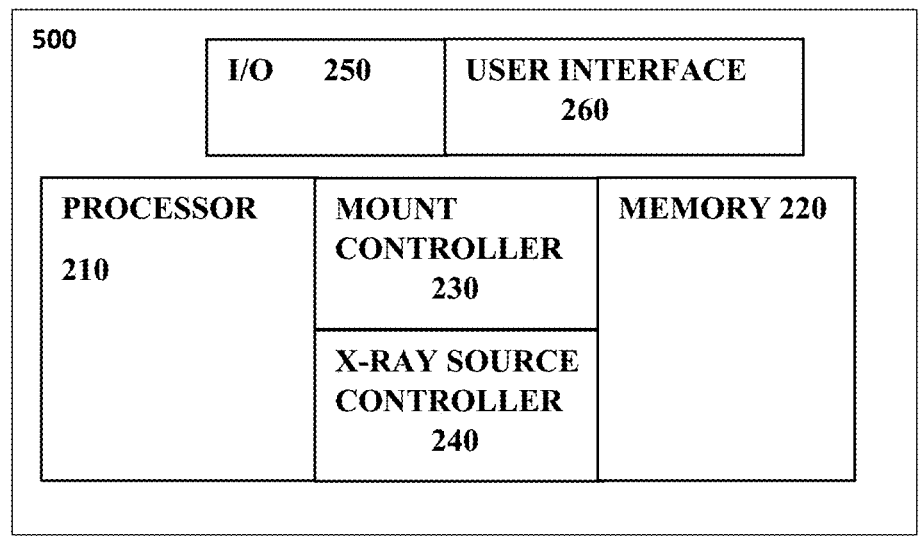
FIG. 2 exemplifies schematically a control unit for use in inspection system according to some embodiments of the present disclosure.

Operation of the inspection system may be determined using a control unit, connected directly or indirectly to the X-ray sources 102 and 104, detectors 106 and 106a, sample mount 110, and optionally to the optical microscope 108. The control unit may be a computer system including one or more processors, memory, communication modules, and may also include a user interface. In this connection reference is made to FIG. 2 illustrating a control unit 500. The control unit 500 may be connected to the inspection system 100 using one or more wires or by wireless communication and is configured for controlling operation of various elements of the inspection system 100 as described in more detail further below. Control unit 500 generally includes one or more processors 210 and memory 220 circuitry (PMC). The processor 210 and memory 220 circuitry is operatively connected to hardware based I/O 250 and/or user interface 260 and configured to provide processing function for operating inspection system 100 as described herein. The processor 210 can be configured to execute one or more functional modules in accordance with computer readable instructions stored within the memory 220 or implemented by one or more computer readable medium (e.g., non-transitory computer readable medium). Such functional modules referred to herein after as comprised in the PMC. For example, as shown in FIG. 2, PMC may include a mount controller 230 operable for generating and transmitting operational commands to the sample mount (110 in FIGS. 1A and 1B) for translating a sample by a selected shift in X-Y plan, and/or to correct mount height by translation along Z axis. Further as exemplified in FIG. 2 PMC may include an X-ray source controller 240 configured and operable for generating and transmitting operational instructions to the two or more X-ray sources 102, 104 or 104a.

such operational instructions may include ON or OFF operations, as well as energy selection for sources that support variation in radiation energy.

Figure 3:
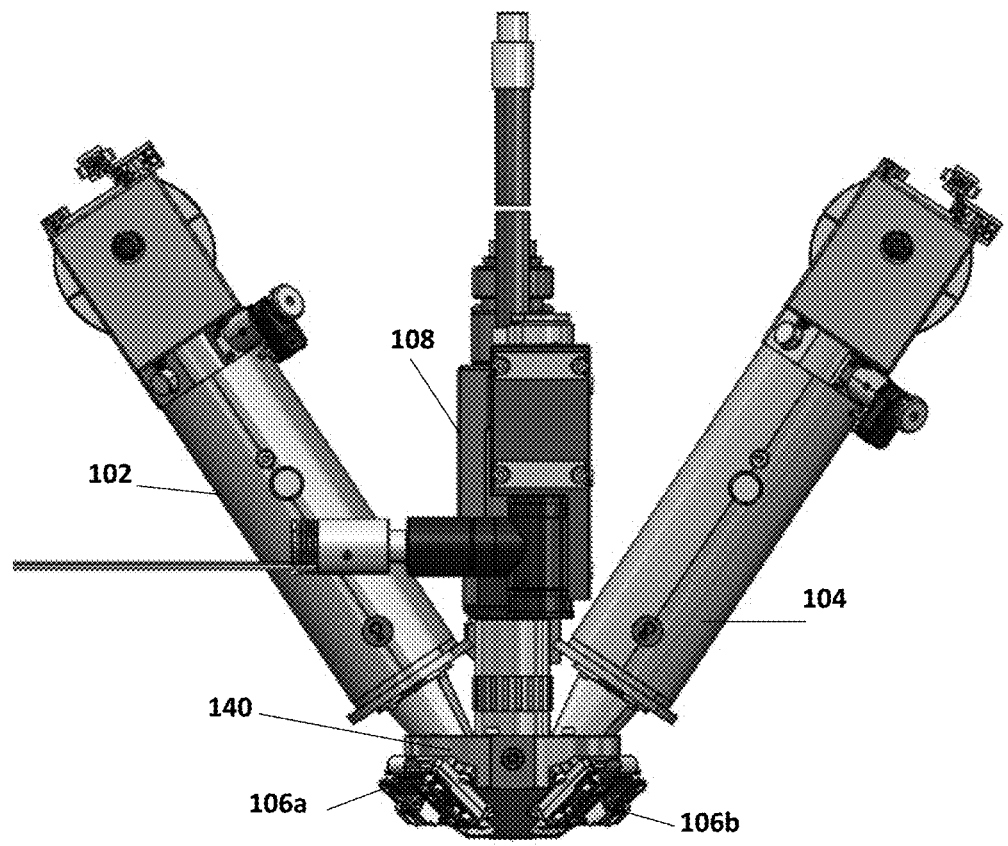
FIG. 3 shows a sketch of an inspection system according to some embodiments of the present disclosure.

Further, reference is made to FIG. 3 illustrating first 102 and second 104 X-ray sources mounted on a common connector 140 according to some embodiments of the present disclosure. As shown, the first 102 and second 104 X-ray sources are mounted with a selected angular orientation, determined in accordance with height of the X-ray sources with respect to the sample mount to direct emitted X-ray beams toward a common illumination spot. The common connector 140 may also include mounts a detector arrangement including one or more detectors exemplified by detectors 106a and 106b, and further includes a mount for the optical microscope 108 placing the microscope above the common illumination spot. It should be noted that generally the inspection system may include any selected number of detectors, such as two detectors, three detectors, four detectors or more. It should also be noted that one advantage of the system of the present disclosure relates to the use of common detector arrangement associated with the first and second (or more) X-ray sources.

Figure 4:
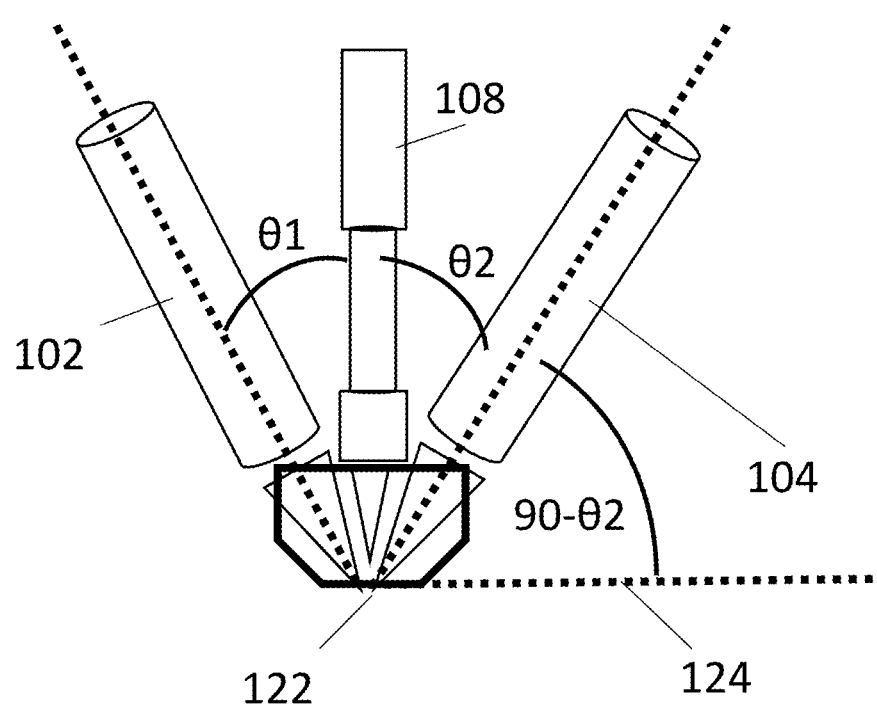
FIG. 4 exemplifies configuration parameters in an inspection system according to some embodiments of the present disclosure.

To simplify system configuration and provide generally similar illumination conditions for the first and second X-ray sources, the X-ray sources may preferably be positioned with similar angular relation with respect to plane of inspection defined by the sample mount. This is exemplified in FIG. 4 illustrating positions and orientation of first 102 and second 104 X-ray sources and optical microscope 108 according to some embodiments of the present disclosure. As shown, the X-ray sources 102 and 104 are mounted at angular orientations θ1 and θ2 respectively, with respect to normal to the inspection plane 124, while directing emitted illumination toward the common illumination spot 122. Typically, the optical microscope 108 may be aligned with the normal to the inspection plane 124, to provide desired optical imaging of the sample and enable operators to identify selected regions of the sample for inspection.

In some other embodiments, typically utilizing first and second X-ray sources having different energy range, the first and second X-ray sources (e.g., 102 and 104a) may be positioned in a non-symmetrical arrangement, providing different height over the inspection plane, and/or providing that θ1 and θ2 are not equal. This may be used in embodiments utilizing a polychromatic first X-ray source 102, and a second X-ray source 104a providing X-ray emission having one or more discrete and relatively narrow energy ranges of illumination.

Generally, the first 102 and second 104 X-ray sources may be located at same or different distances from the illumination spot. Selection of distance of the X-ray sources may be determined based on both space requirements due to size and form factor of different X-ray sources, as well as in accordance with desired illumination and optical properties. The X-ray sources are typically associated with optical arrangement for shaping emitted radiation to form illumination beam, and divergence or collimation level of the beam, together with distance to the illumination spot affect the size of the illumination spot.

Figure 5:
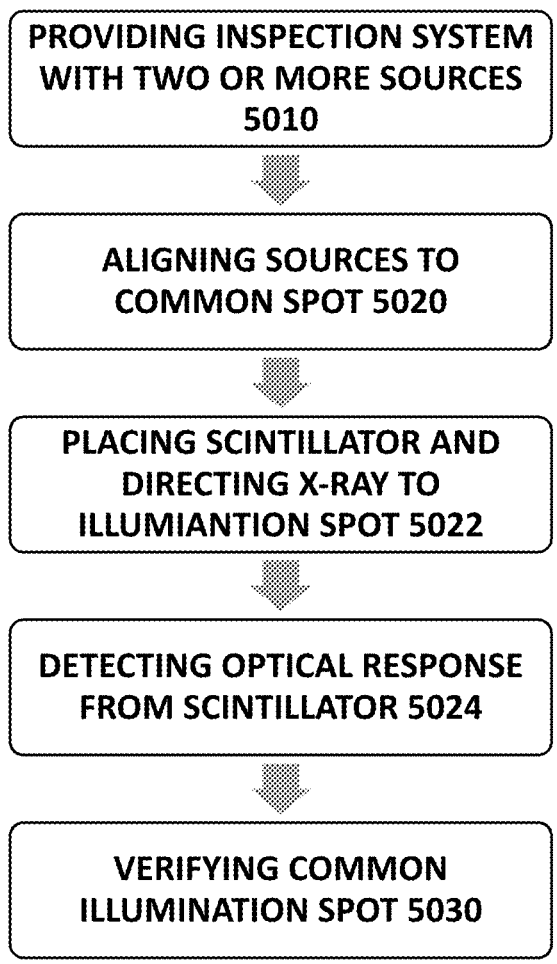
FIG. 5 is a block diagram exemplifying inspection operation according to some embodiments of the present disclosure.

Generally, the common connector 140 may allow certain alignment of the first and second X-ray sources 102 and 104 to enable adjustment of illumination pattern thereof and provide common illumination spot. FIG. 5 exemplifies a method allowing proper alignment of the X-ray sources and optical microscope to the common illumination spot. As shown, the method includes providing a system having two or more X-ray sources 5010 and aligning the X-ray sources to a common illumination spot 5020. Aligning the X-ray source may include placing a scintillator unit at the desired illumination spot 5022 and detecting optical response of the scintillator 5024 in response to illumination with X-ray radiation by the first and second X-ray sources (typically one after the other). Detection of optical response of the scintillator at common spot due to illumination by both the first and second X-ray sources, provides verification to common illumination spot 5030.

A scintillator is an element or material that exhibits scintillation. More specifically, a scintillator emits optical illumination in response to excitation illumination impinging thereon. Scintillators are often used for radiation detection, and is used herein for detection of X-ray illumination and location of the illumination spot. To determine exact location of the illumination spot, the X-ray sources may be operated sequentially, while the optical microscope may be aligned to provide imaging and optical inspection about the illumination spot, to determine its location based on optical emission of the scintillator.

The use of scintillator for identifying exact location of illumination spot formed by each of the X-ray sources, enables a simple a reliable technique for aligning the x-ray sources to a common illumination spot. Proper alignment of the X-ray sources to a common illumination spot enables sample inspection using combined illumination from the X-ray sources to increase illumination intensity. Alternatively, the X-ray sources may be used sequentially such that a first X-ray source is used for scanning the sample, and at selected locations, the first X-ray source may be turned off, and the second X-ray source is used for inspection of the selected locations. This enables combined inspection while simplifying registration of the collected data to sample coordinates.

Figure 6:
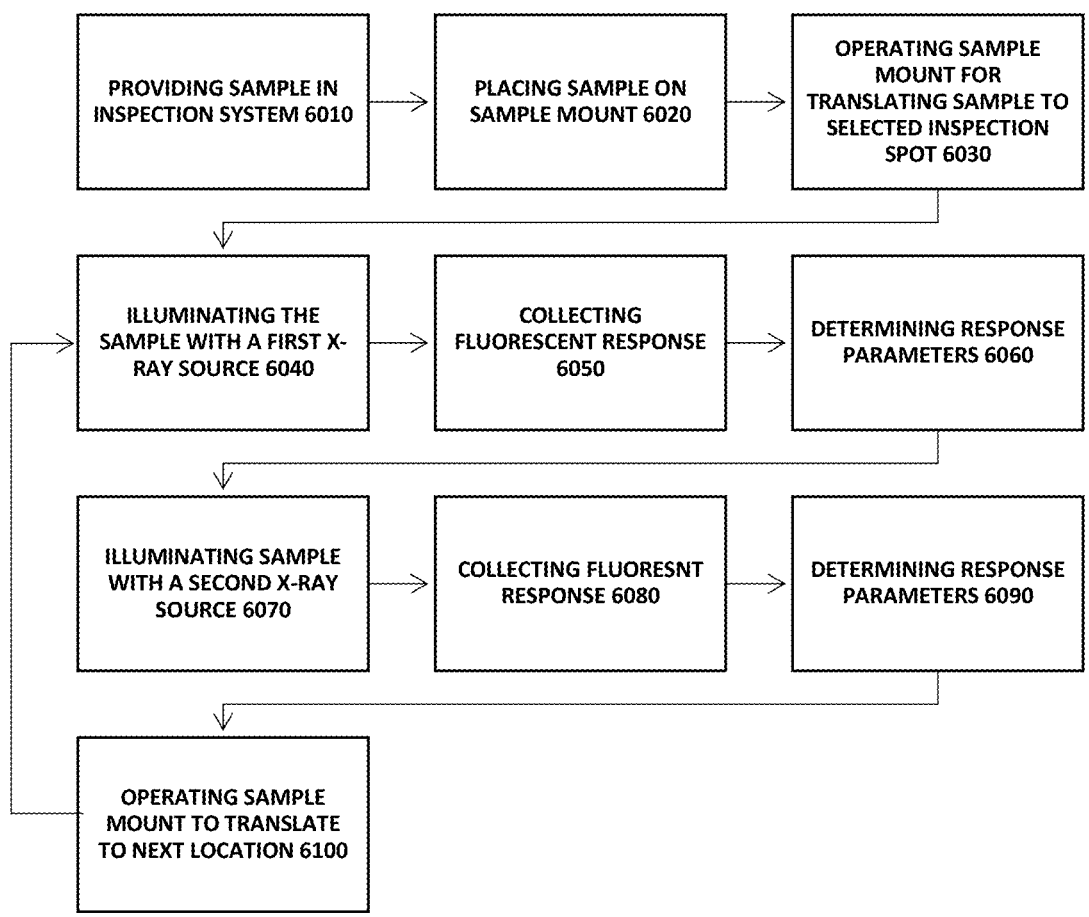
FIG. 6 exemplifies in a block diagram a further inspection method according to some embodiments of the present disclosure.

In this connection, FIG. 6 exemplifies an operation method for sample inspection according to some embodiments of the present disclosure. As exemplified in FIG. 6, in order to begin inspection, a sample for inspection is typically provided within the inspection system 6010. Generally, the sample is placed on the sample mount 6020 (110 in FIG. 1), the sample may be held onto the sample mount by mechanical clamp and/or using low pressure mounting. When the sample is placed, the system may be operable by operating the sample mount to translate to selected inspection spot 6030. Typically, in some embodiments, the sample may perform selected translation shifts to determine sample size and location and to calibrate registration data.

Once the sample mount places the sample at a selected inspection spot, the system operates for illuminating the sample with a first X-ray source 6040 and for collecting fluorescent response from the sample 6050. The collected fluorescent response is detected by the one or more detectors and transmitted to the control unit for determining response parameters 6060 for the inspected location. In accordance with inspection pattern, the system may further illuminate the same inspection position using the second X-ray source 6070, collect the fluorescent response 6080, and operate the control unit for determining response parameters 6090. After inspecting and determining parameters for a selected inspection location, the control unit may operate the sample mount to translate to next inspection location 6100 and repeat the inspection process by illuminating the sample 6040.

Figure 7:
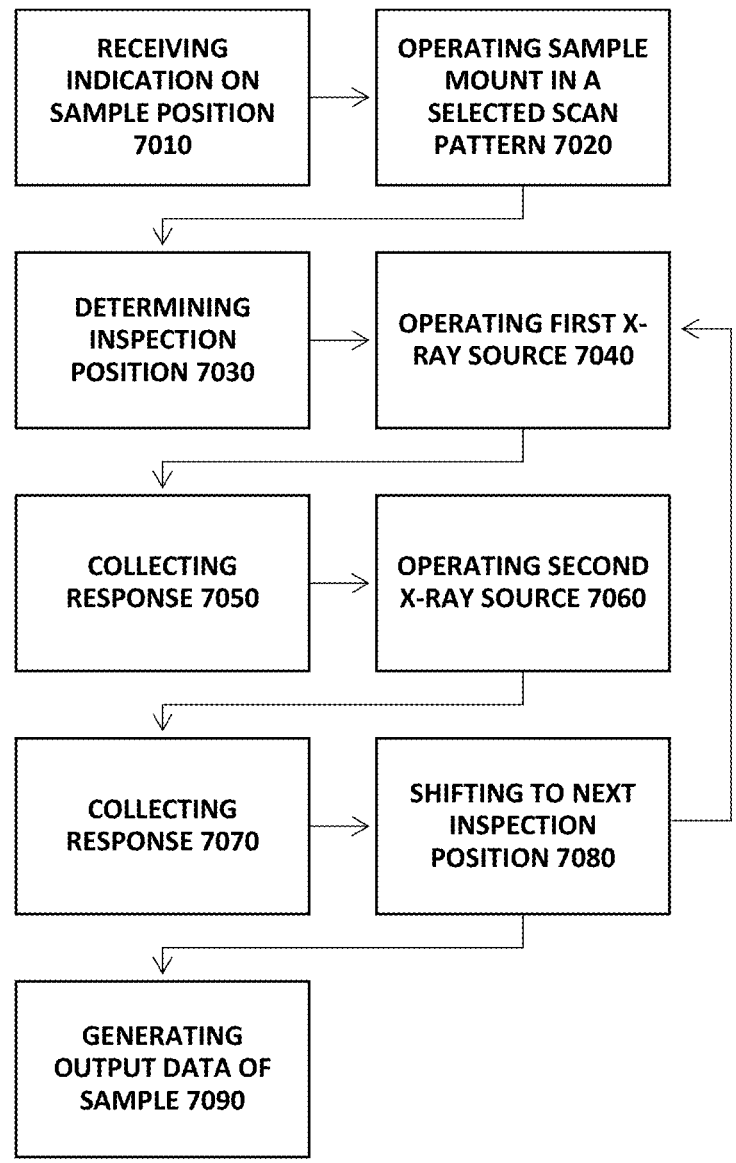
FIG. 7 exemplifies in another block diagram an inspection method according to some embodiments of the present disclosure.

The inspection technique as exemplified in FIG. 6 enables inspection of a sample using first and second illumination properties, e.g., first and second illumination energy ranges, while simplifying registration and providing overlapping output data, where each selected location is inspected using the different illumination properties. The operation method exemplified in FIG. 6, following the actions of providing the sample, may be implemented using computer readable instructions, pre-stored in the memory of control unit and executed by the processor. FIG. 7 exemplifies a method of operation suitable for implementation as computer readable instructions executed by one or more processors.

More specifically, the instructions include being responsive to, or receiving, indication message on sample position on the sample mount 7010, and operating the sample mount in a selected scan pattern 7020. Within the selected scan pattern, the method includes determining an inspection position 7030 associated with a location on the sample that is to be inspected and operating a first X-ray source 7040 for illuminating the illumination spot on the sample. Generally, the detector arrangement operates to collect emission response from the sample, and the control unit is operated to collect the response data from the detector arrangement 7050. The processor may generally store the collected response data with reference to the inspection position. Further, the processor may operate to determine is inspection using the second X-ray source is needed for this specific position and proceed to operating the second X-ray source 7060 for illuminating the sample, is the inspection position is selected for inspection using the second X-ray source. Similarly, the technique further includes receiving/collecting response emission of the sample 7070 and storing the response data with reference to the inspection position. After finishing inspection of a position on the sample, the processor generates instructions to the sample mount for shifting to next inspection position 7080 in accordance with the selected scan pattern, and operates for inspecting the next position as indicated in 7040. When the scan pattern is complete, the method further includes generating output data indicative of sample response to illumination in the inspected positions 7090.

Figure 8:
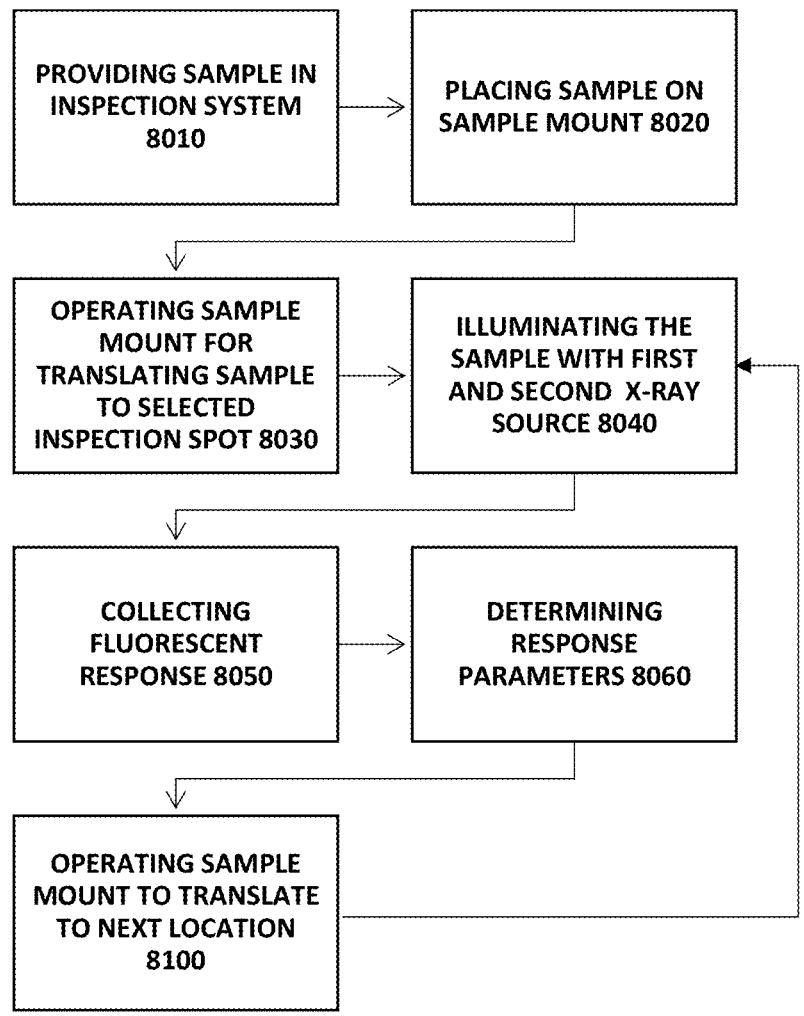
FIG. 8 exemplifies in a block diagram, an inspection method utilizing simultaneous illumination using first and second X-ray sources according to some embodiments of the present disclosure.

Additionally, FIG. 8 exemplifies a method for inspection of a sample using simultaneous operation of at least first and second X-ray sources according to some embodiments of the present disclosure. As exemplified in FIG. 8, to begin inspection, a sample for inspection is typically provided within the inspection system 8010. Generally, the sample is placed on the sample mount 8020 (110 in FIG. 1), the sample may be held onto the sample mount by mechanical clamp and/or using low pressure mounting. When the sample is placed, the system may be operable by operating the sample mount to translate to selected inspection spot 8030. Typically, in some embodiments, the sample may perform selected translation shifts to determine sample size and location and to calibrate registration data. Once the sample mount places the sample at a selected inspection spot, the system operates for illuminating the sample with the at least first and second X-ray sources simultaneously 8040 and for collecting fluorescent response from the sample 8050. The collected fluorescent response is detected by the one or more detectors and transmitted to the control unit for determining response parameters 8060 for the inspected location. In accordance with inspection pattern, the system may further illuminate the same inspection position using the second X-ray source 6070, collect the fluorescent response 6080, and operate the control unit for determining response parameters 6090. After inspecting and determining parameters for a selected inspection location, the control unit may operate the sample mount to translate to next inspection location 6100 and repeat the inspection process by illuminating the sample 6040 at a different selected position. As indicated above, simultaneous illumination using at least first and second X-ray sources, enables increase illumination intensity per unit area of the illumination spot and thus allows for increasing signal to noise ratio in detection of small variations in material composition of the sample. This may also be efficient for detection of low concentrations of selected elements in the sample.

As indicated herein, the inspection using the first and second (and optionally additional) X-ray sources can be performed using common scan pattern providing that sample response at each location may be measured using different illumination properties. This reduces any registration processing required for alignment of the inspection results.

Thus, as indicated above, the present disclosure provides for an inspection system and method for operation thereof, using two or more X-ray sources for inspection of a sample. The two or more sources are aligned with angular orientation to provide illumination of a common illumination spot on a sample plane, where the sample plane is defined by sample mount of the system.

It is to be noted that the various features described in the various embodiments can be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. An X-ray inspection system comprising:
   at least two X-ray sources and at least one optical microscope;
   the at least two x-ray sources are positioned and oriented at selected angles with respect to an inspection plane, to provide a common illumination spot on said inspection plane; and
   the at least one optical microscope is positioned between said at least two X-ray sources being aligned with respect to normal to said inspection plane and directed for imaging said common illumination spot on said inspection plane.

2. The inspection system of claim 1, further comprising a sample mount for placing a sample to be inspected, said sample mount defining said inspection plane, and wherein said at least two X-ray sources are placed at selected angles with respect to said inspection plane.

3. The inspection system of claim 2, wherein said at least two X-ray sources are placed at equal distances with respect to said common illumination spot.

4. The inspection system of claim 2, wherein said at least two X-ray sources are placed symmetrically with respect to normal to said inspection plane intersecting said inspection plane at said common illumination spot.

5. The inspection system of claim 2, wherein said at least two X-ray sources are placed in at least first and second different distanced distances with respect to said common illumination spot.

6. The inspection system of claim 1, wherein said at least two X-ray sources are configured for emitting X-ray radiation formed of one or more discrete energy bands.

7. The inspection system of claim 1, wherein said at least two X-ray sources are polychromatic X-ray sources.

8. The inspection system of claim 1, wherein said optical microscope is oriented for imaging said illumination spot at normal angle with respect to said inspection plane.

9. The inspection system of claim 1, comprising two X-ray sources, said two X-ray sources are positioned and oriented symmetrically at two opposing sides of a virtual plane perpendicular to said inspection plane.

10. The inspection system of claim 1, comprising three X-ray sources positioned and oriented in a triangular symmetry with respect to an axis perpendicular to said inspection plane and intersecting said inspection plane at said common illumination spot.

11. The inspection system of claim 1, wherein said at least two X-ray sources are positioned with respective two or more different angular orientations and distances while directed to illuminate said common illumination spot on said inspection plane.

12. The inspection system of claim 1, further comprising a detector arrangement comprising at least one X-ray detector configured for collecting fluorescent response from said sample in response to illumination using at least one of said at least two X-ray sources.

13. The inspection system of claim 12, wherein said detector arrangement comprises at least two detectors, each detector is configured to collect X-ray fluorescent emission from the sample in response to irradiation by either one of said at least at least two X-ray sources.

14. The inspection system of claim 12, wherein said detector arrangement comprises at least one silicon drift detector.

15. A method for use in sample inspection, the method comprising:
(a) providing an inspection system having two or more X-ray sources oriented to illuminate a common illumination spot;
(b) placing a sample at an inspection plane for inspection;
(c) inspecting the sample using an optical microscope and selecting one or more regions for inspection using one or more of the two or more X-ray sources;
(d) shifting said common illumination spot with respect to said sample for scanning said sample using at least one of said two or more X-ray sources, and
(e) providing output data indicative of collected signal from one or more regions of the sample.

16. The method of claim 15, wherein for one or more selected regions of the sample, operating said two or more X-ray sources sequentially illuminating said sample using said two or more X-ray sources, one at a time, and collecting signal with respect to the selected location and the selected X-ray source, thereby scanning said sample using said two or more X-ray sources.

17. The method of claim 15 comprising scanning said sample using a first X-ray source of said two or more X-ray sources and operating one or more additional X-ray sources of said two or more X-ray sources for scanning selected regions of the sample in accordance with one or more region parameters.

18. The method of claim 15, further comprising operating at least two or said two or more X-ray sources for illuminating one or more selected regions of the sample, thereby enhancing illumination intensity and signal collection.

* * * * *

UNITED STATES PATENT AND TRADEMARK OFFICE
CERTIFICATE OF CORRECTION

PATENT NO. : 12,050,187 B1  
APPLICATION NO. : 18/369411  
DATED : July 30, 2024  
INVENTOR(S) : Avishai Shklar, Yeroslav Berezin and Ofek Oiknine Page 1 of 1

It is certified that error appears in the above-identified patent and that said Letters Patent is hereby corrected as shown below:

In the Claims

Claim 5, Column 11, Line 3 should read: different distances with respect to said common Signed and Sealed this  
Third Day of June, 2025

Coke Morgan Stewart  
*Acting Director of the United States Patent and Trademark Office*